United States Patent

[11] 3,633,163

[72] Inventor Hans P. Birchmeier
Sierra Madre, Calif.

[21] Appl. No. 867,298
[22] Filed Oct. 17, 1969
[45] Patented Jan. 4, 1972
[73] Assignee Burroughs Corporation
Detroit, Mich.

[54] PLURAL LEVEL HIGH-SPEED SELECTION CIRCUIT

5 Claims, 3 Drawing Figs.

[52] U.S. Cl. .......... 340/147, 340/166
[51] Int. Cl. .......... H04q 1/00, H04q 5/00, H04q 9/00
[50] Field of Search .......... 340/147 LP, 166

[56] References Cited

UNITED STATES PATENTS

| | | | |
|---|---|---|---|
| 3,229,253 | 1/1966 | Logue .......... | 340/166 |
| 3,300,758 | 1/1967 | Hawley .......... | 340/147 LP |
| 3,413,607 | 11/1968 | Fine .......... | 340/166 X |

*Primary Examiner*—Harold I. Pitts
*Attorney*—Christie, Parker & Hale

ABSTRACT: There is described a selection circuit for selecting one among a number of contending input signals for completing a circuit to the selected one of the inputs. The selection is done on a multilevel basis. A plurality of selection circuits are arranged as separate modules in the first level with each module selecting one among a small group of the input signals. A second level of modular selection circuits in turn each select among a small group of the outputs of the first level selection circuits. If necessary, additional levels of modular selection circuits select among the outputs of the immediately lower level.

PATENTED JAN 4 1972 3,633,163

INVENTOR
HANS P. BIRCHMEIER

BY

Christie, Parker & Hale
ATTORNEYS

PLURAL LEVEL HIGH-SPEED SELECTION CIRCUIT

FIELD OF THE INVENTION

This invention relates to digital control circuits, and more particularly, is concerned with a selection system for selecting one among a number of contending binary coded input signals.

BACKGROUND OF THE INVENTION

In the control of peripheral devices by a processor, a number of the peripheral devices may request attention at the same time. It is necessary for control equipment in the processor to detect, select and connect to just one of the peripheral devices requesting attention. In the past, the selection and designation of one of the contending peripheral units requesting attention has been handled in one of two ways.

One technique has been to utilize a counter or other device for monitoring the requests for attention in a fixed sequence. When an input signal is found that indicates an attention request is present, the counting is interrupted and a connection is completed between the peripheral device and the processor. When the peripheral device is serviced, the attention request is remove, permitting the continuation of the sequential monitoring of the attention request lines from the other peripheral devices in sequence. The difficulty with such an arrangement is that it is a serial type of operation, and if there are a large number of peripheral devices, the time involved to scan all of the inputs may be prohibitively long. This is particularly true in computer systems in which a large number of remote stations are serviced by data communication lines.

An alternative technique which uses parallel logic selects one of the contending lines on a predetermined priority basis. A priority level is assigned to every incoming attention request line. If there is a request present on more than one line, the line assigned with the highest priority is selected while the lower priority lines are blocked. While such a system is inherently much faster in the selection process, it has the disadvantage that low priority lines are blocked by requests of higher priority lines and may never get serviced.

SUMMARY OF THE INVENTION

The present invention is directed to a selection circuit for servicing a large number of inputs at a much higher speed than if all of the inputs were monitored in sequence. The circuit avoids the problems of lockout of low priority inputs present in the usual priority selection system. This is accomplished by utilizing a plurality of modular selection circuits arranged in parallel selection levels. Each selection circuit module receives a small number of inputs, the circuit detecting the presence of request signals on any of the inputs, selecting one if there is more than one request signal, and providing a signal on a corresponding one of an equal number of outputs. The first level of selection circuit modules includes sufficient modules to receive all of the incoming attention request lines. The next level includes sufficient modules to provide one input for each of the modules in the first level. The last level is reached by this dividing process when the number of modules in the level is reduced to one. The outputs of a module in one level are used to select one of the associated modules in the immediately lower level, so that only one module receiving a request signal in the lowest level is selected at a time. This module turn selects the lowest level is selected at provides one output in response to more than on contending request signal, thus providing a signal on only one output regardless of how many contending input request signals are present.

BRIEF DESCRIPTION OF THE DRAWINGS

For a better understanding of the invention, reference should be made to the accompanying drawings wherein.

DETAILED DESCRIPTION OF THE INVENTION

Figure 1:
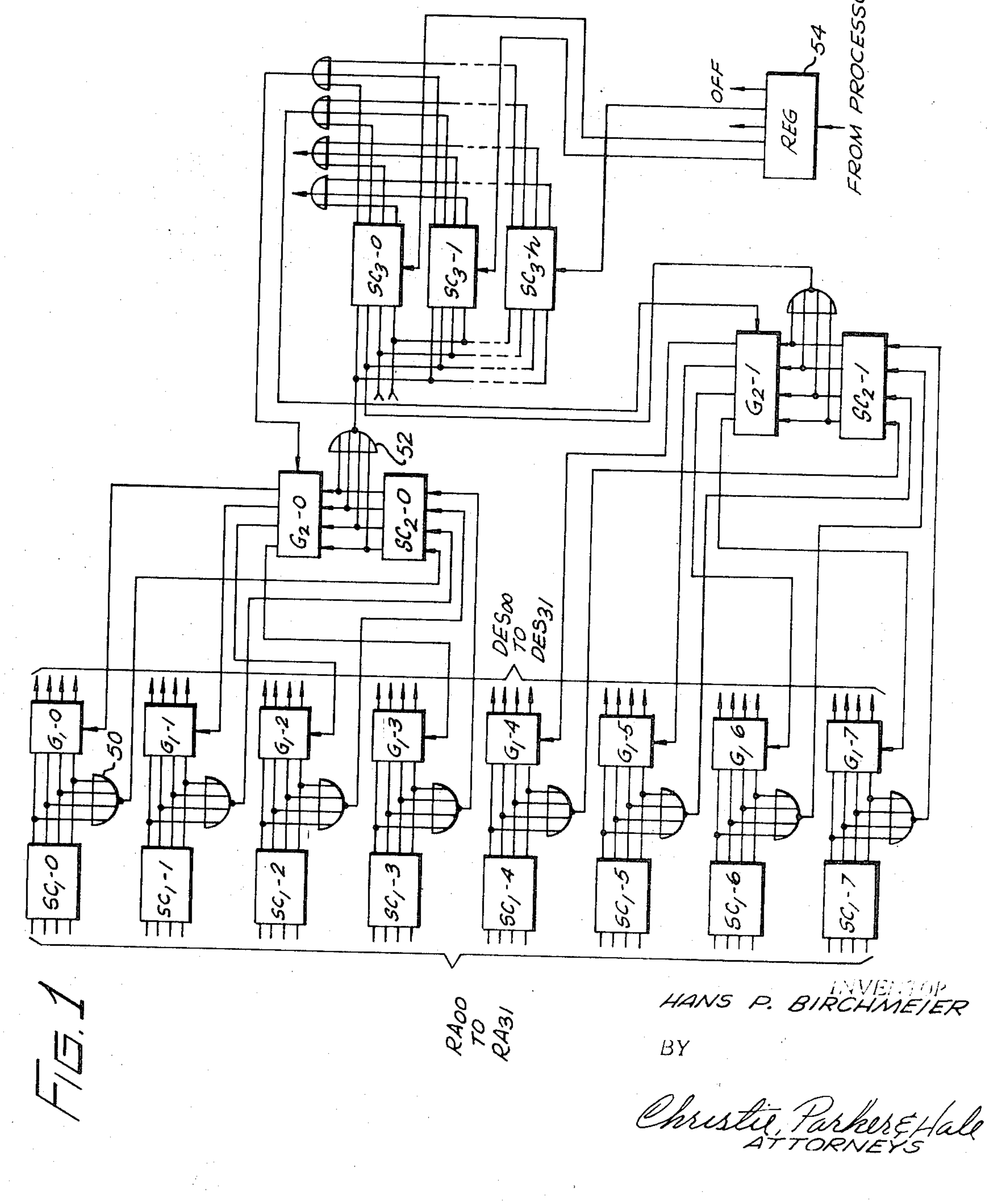
FIG. 1 is a schematic block diagram of one embodiment of the present invention.

Referring to FIG. 1 in detail, there is shown a multilevel selection circuit, which by way of example only, is shown as incorporating three levels. Each level includes a plurality of selector circuit modules. The first level modules are designated $SC_1$–0 to $SC_1$–7. Two modules are shown in the second level, designated $SC_2$–0 and $SC_2$–1, and one module shown in the third level, designated $SC_3$–0. The number of modules in the first level is determined by the number of request lines applied to the selection circuit and the number of input lines available to each module.

Figure 2:
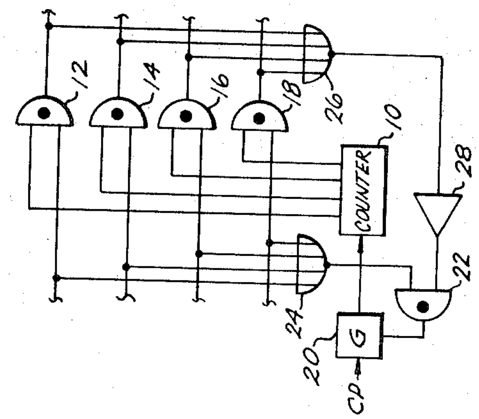
FIGS. 2 and 3 are schematic block diagrams of alternative selection circuit modules.
Figure 3:
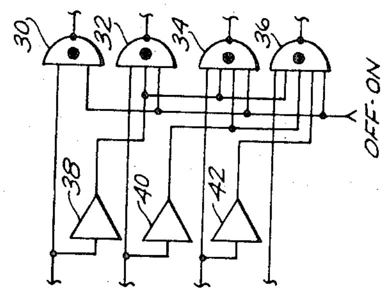

The input lines receiving the signals requesting attention are RA00 through RA31 in the example shown in FIG. 1. The input lines receive binary input signals in the form of two different voltage levels, for example. Each selection circuit module, in response to a positive level on one or more of the inputs, indicating that the inputs are signaling for attention, selects one of the contending inputs and provides a positive going output level on a corresponding one of the output lines. FIGS. 2 and 3 show two alternative selector circuit modules.

The sequential-type circuit shown in FIG. 2 includes a counter 10 which advances through as many states as there are input lines to the selector module circuit. In the example shown, this is four states. The four outputs from the counter 10 are applied respectively to four logical AND-circuits 12, 14, 16 and 18. The four inputs to the module are also applied respectively to the four logical AND-circuits. The counter 10 is cycled through its four states by clock pulses passed by a gate 20. The gate 20 is controlled by a logical AND-circuit 22 which senses that at least one of the input lines has a request signal present. To this end all the input lines are connected through an OR-circuit 24 to one input of the AND-circuit 22. The AND-circuit 22 also senses that none of the output lines from the four AND-circuits 12–18 is true. This condition is derived by an OR-circuit 26 to which all the output lines are connected and an inverter 28. Thus when one of the input lines goes true, the counter 10 begins to count until it reaches a state corresponding to the first input line in sequence which is true. The output of the corresponding AND-circuit goes true, causing the output of the inverter 28 and therefore the output of the AND-circuit 22 to go false, stopping further counting of the counter 10.

A priority-type circuit is shown in FIG. 3 in which the four input lines are respectively applied to four logical AND-circuits 30, 32, 34, and 36. Each of the input lines is connected through an inverter to the AND-circuits associated with all the lower priority lines. Thus when a particular line goes true, it blocks the AND-circuits associated with all the lower order priority lines. The inverters are indicated at 38, 40, and 42 respectively. An OFF-ON line may be applied to each of the AND-circuits 30–36 by means of which a control signal can turn the module off or on.

All of the first level selection control modules of FIG. 1 utilize the sequential selection circuit of FIG. 2. The output lines from each module of the first level are connected to a common gating circuit. These output gating circuits are designated $G_1$–0 through $G_1$–7. Each of these gating circuits is controlled by a single input which, if true, gates the four output lines from the associated first level module to four output lines which designate a particular source of an attention request signal. The outputs from the respective gating circuits are indicated as DESOO through DES31. Only one of the gates is operated as a time so that only one of the plurality of request attention input lines results in an output designation line being true.

The gating circuits of the first level are controlled in turn by a second level of selection circuit modules, indicated at $SC_2$–0 and $SC_2$–1. There is one module in the second level for each four modules in the first level. Each input to a module in the second level senses all the output lines from a module in the first level. Thus the four lines from the module $SC_1$–0 are coupled through an OR-circuit 50 to the first input of the module $SC_2$–0. Similarly the four output lines from the $SC_1$–1, $SC_1$–2, and $SC_1$–3 modules are connected respectively to the other three inputs of the module $SC_2$–0. Assuming there are more than two levels of selection circuit modules, the second level modules are also preferably of the type of circuits shown in FIG. 2. If there is at least one output line from two or more modules of the first level which are true, the selection circuit module of the second level makes a selection, making only one of the the four output lines true.

Again the outputs of each of the selection circuit modules of the second level are applied to respective gating circuits, indicated at $G_2$–0 and $G_2$–1. The outputs from these gating circuits are respectively connected back to each of the gating circuits associated with the first level. In this manner the selection circuit of the second level selects one of the four gating circuits of the first level, so that an output designation can be derived from only one of the four associated first level modules. Similarly the second level module $SC_2$–1 controls an additional four modules of the first level.

To select between the two groups of four modules of the first level, a third level module, $SC_3$–0, is required. Each of the inputs to the third level module senses all of the outputs of one of the second level modules. Thus the four output lines from the module $SC_2$–0 are connected through an OR-circuit 52 to one input of the selection circuit module $SC_3$–0. In the example shown, only two of the inputs to the third level module are used, but it will be understood that if the first level were expanded to include an additional eight modules, the second level would be expanded to include an additional two modules, and then all four inputs to the third level module would be used. If the circuit were expanded even more, a fourth level would be added to the circuit.

The two outputs from the third level module $SC_3$–0 are applied respectively to the control input of the gating circuits $G_2$–0 and $G_2$–1. Thus the third level selection circuit selectively operates only one of the gating circuits associated with the second level, thereby ensuring that only one of the gating circuits in the first level is activated.

Assuming the circuit were expanded to include 16 modules in the first level, thereby utilizing all four inputs of the module in the third level, the total time required for the selection of a particular input would be nine clock pulse times, namely, a maximum of three counts to select an input line from the first level, three counts to select an input line at the third level, and three counts to select an input line at the third level this is in contrast to the possible 63 clock times required for the sequential selection-type circuit to service 64 attention requesting input lines.

The third level selection circuit module, as well as the second level selection circuit modules, may utilize the circuit of FIG. 3. This would give priority to certain groups of inputs. It may be desirable, for example, to provide a number of priority-type selection circuit modules in parallel at the third level, such as indicated by the additional module $SC_3$–1. Each parallel module is then arranged to provide a different priority arrangement. By means of the OFF-ON inputs, the selection of a particular priority circuit in the third level can be controlled programmatically by a register 54. Depending upon the word stored in the register 54, any one or none of the selection control modules in the third level may be activated.

In the above description it will be seen that a modular-type selection circuit is provided which can detect, select, and designate one of a large number of inputs, any number of which may be receiving contending request signals. The circuit avoids the problem of having a low priority line blocked by the presence of an input signal on any one of a large number of higher priority lines and at the same time it avoids the problem of excessive time in finding a line requesting service.

What is claimed is:

1. A multilevel selection system for selecting one among a plurality of signaling sources any one of which at any time may provide an output signal indicating it as a signaling source, and providing an output signal designating the selected one of the sources, comprising a plurality of modular selection circuits, each circuit including means for generating an output on one of a plurality of outputs in response to a signal on one or more of a corresponding number of inputs, the modular circuits being arranged in multiple levels with each selection circuit in a particular level being identical and having all of the outputs coupled to one input of a selection circuit of the next higher order level, gating means coupled to the output of each of the selection circuits of all but the highest order level, the gating means for each selection circuit in a particular level being controlled by one of the outputs of a selection circuit in the next higher order level, each of the signaling sources having its output signal coupled to a respective one of the inputs of the lowest order level selection circuits, the output of the gating means associated with the lowest order level of selection circuits providing the output designating the selected source, the modular selection circuits in at least one of the levels including sequencing means, means controlled by the sequencing means for gating each of the inputs to the respective outputs in sequence in response to a signal on any one of the inputs, and means responsive to a signal on any of the outputs for interrupting said sequencing means, and the modular selection circuit in at least one of the other levels including means for gating each of the inputs to a corresponding output, the inputs being numbered 1 through $n$ and means responsive to a signal on a particular input for inhibiting an output from any of the higher numbered inputs.

2. Apparatus for selecting and designating one of a plurality of signaling sources where more than one source may be signaling at the same time comprising a plurality of first level circuits, each of said circuits being connected to a different group of said signaling sources, each first level circuit including means for selectively activating one of a plurality of output lines in response to an input from one or more of the associated signaling sources, at least one second level circuit, the second level circuit being connected to the outputs of a group of said first level circuits, the second level circuit including means for selectively activating one of a plurality of output lines in response to an input from one or more of said first level circuits connected thereto, and means responsive to a signal on one of the output lines from said second level circuit and a signal on one of the output lines of an associated one of the first level circuits for providing an output designation signal.

3. Apparatus as defined in claim 2 wherein each of the first level circuits includes sequencing means, means controlled by the sequencing means for gating each of the inputs to the respective outputs in sequence in response to a signal on any of the inputs, and means responsive to a signal on any of the outputs for interrupting said sequencing means.

4. Apparatus as defined in claim 3 wherein the second level circuit includes means for gating each of the inputs to a corresponding output, the inputs being numbered 1 through $n$, and means responsive to a signal on a particular input for inhibiting an output from any of the higher numbered inputs.

5. Apparatus as defined in claim 4 further including additional second level circuits, all of the second level circuits being connected in parallel between common inputs and common outputs, and means for selectively activating one of said parallel connected second level circuits at a time.

* * * * *

PO-1050
(5/69)

UNITED STATES PATENT OFFICE
CERTIFICATE OF CORRECTION

Patent No. 3,633,163 Dated January 4, 1972

Inventor(s) HANS P. BIRCHMEIER

It is certified that error appears in the above-identified patent and that said Letters Patent are hereby corrected as shown below:

Column 1, line 24 - "remove" should read --removed--,
line 65 - After "module" insert --in--,
After "selects" insert --and--,
Delete "the lowest level is selected at"

Column 3, line 47 - "third" should read --second--,
line 48 - Insert a period after "level",
"this" should read --This--.

Column 4, line 32 - After "n" insert a comma.

Signed and sealed this 6th day of June 1972.

(SEAL)
Attest:

EDWARD M.FLETCHER,JR.
Attesting Officer

ROBERT GOTTSCHALK
Commissioner of Patents